Patented Sept. 21, 1937

2,093,590

UNITED STATES PATENT OFFICE 2,093,590

2-AMINOQUINIZARIN AND SUBSTITUTION PRODUCTS THEREOF AND A PROCESS OF PREPARING THEM

Hans Schlichenmaier, Kelkheim in Taunus, and Ludwig Wilhelm Berlin, Frankfort-on-the-Main-Hochst, Germany, assignors to General Aniline Works, Inc., New York, N. Y., a corporation of Delaware No Drawing. Application May 19, 1936, Serial No. 80,638. In Germany May 23, 1935

7 Claims. (Cl. 260—59)

This invention relates to 2-aminoquinizarin and substitution products thereof and to a process of preparing them.

It is known that the beta-substitution products of quinizarin, when treated with reducing agents, do not yield the corresponding beta-substituted leuco-quinizarins, but, according to the nature of the reducing agent, there is split off either a hydroxy-group in 1-position (cf. German Specification No. 212,697) or the substituent in 2-position. Thus, for instance, 1,2,4-trihydroxy-anthraquinone, 1,4-dihydroxy - 2 - chloroanthraquinone and 1,4-dihydroxyanthraquinone-2-sulfonic acid yield with reducing agents, such as hydrosulfite or zinc dust, leucoquinizarin and quinizarin, respectively.

Now, we have found that 2-amino-quinizarin is obtainable in a smooth reaction by causing hydrogen to act in the presence of a reducing catalyst, such as nickel or platinum, and of a diluent, upon, for instance, 2-nitroquinizarin. 2-aminoquinizarins have not yet been described in literature; they are valuable intermediates for the manufacture of dyestuffs.

The following examples serve to illustrate the invention, but they are not intended to limit it thereto; the parts are by weight:

(1) 71 parts of 2-nitroquinizarin are suspended in 500 parts of water and, after addition of 2 parts of a nickel catalyst, they are treated in a horizontal iron stirring drum with hydrogen under an average pressure of 20 atmospheres. The operation may also be performed under a lower pressure. The drum is heated, the pressure begins to fall at 45° C. to 50° C. If the temperature is gradually raised to about 60° C. the absorption of hydrogen is finished after about 2½ hours. After cooling, the contents of the drum are filtered with suction, the solid matter is dried at 100° C. and, in order to remove the catalyst, recrystallized from nitrobenzene. The 2-aminoquinizarin is thus obtained with a good yield in the form of well defined black-brown crystals which melt at 312° C. The new compound is nearly insoluble in water and ether; it dissolves to a small extent in benzene, toluene or chlorobenzene and it dissolves rather easily in hot nitrobenzene to a red solution. The amine readily dissolves in concentrated sulfuric acid to a red solution. The concentrated solution in sulfuric acid shows a yellowish-red fluorescence. The compound dissolves in cold aqueous caustic alkali; it dissolves to a small extent in warm aqueous alkali carbonate to a violet solution. On addition of dilute acids no salts are formed.

In this process of preparing 2-aminoquinizarin there may be used instead of the nickel catalyst the equivalent amount of a platinum catalyst; It is then possible to carry out the reduction also under ordinary pressure. For the water used in the reduction there may be substituted alcohol, chlorobenzene or similar substances.

(2) 90 parts of 1,3,4-trihydroxy-2-nitroanthraquinone are treated as described in Example (1) in an aqueous suspension, in the presence of a nickel catalyst, with hydrogen under elevated pressure. The absorption of hydrogen takes place at about 50° C. to about 70° C. and under a pressure of about 10 to about 15 atmospheres; it is finished after about 2½ hours.

The contents of the drum are filtered with suction, the solid matter is dried and, in order to remove the catalyst, recrystallized from nitrobenzene. Thus, the 1,3,4-trihydroxy-2-aminoanthraquinone is obtained in the form of well defined brown-red needles which decompose at 335° C. The compound is insoluble in water; in alcohol, glacial acetic acid and toluene it dissolves to a small extent at raised temperatures to yellow-red solutions. In boiling nitrobenzene it is somewhat more easily soluble to a solution from which it can be obtained, on cooling in the form of well formed crystals. The product dissolves in caustic soda solution to a red-violet solution which turns yellow-red after addition of hydrosulfite. In concentrated sulfuric acid it dissolves to a red-yellow solution.

We claim:

1. The process which comprises causing hydrogen to act in the heat on a 2-nitroquinizarin in the presence of a diluent and a reduction catalyst of the group consisting of nickel and platinum catalysts the reaction components contained in a closed pressure vessel.

2. The process which comprises causing hydrogen to act on a 2-nitroquinizarin in the presence of water and a nickel catalyst by heating to a temperature of about 40° C. to about 70° C. the reaction components contained in a closed pressure vessel.

3. The process which comprises causing hydrogen to act on 2-nitroquinizarin in the presence of water and a nickel catalyst by heating to a temperature of about 45° C. to about 60° C. the reaction components contained in a closed pressure vessel.

4. The process which comprises causing hydrogen to act on 1,2,4-trihydroxy-3-nitroanthraquinone in the presence of water and a nickel catalyst by heating to a temperature of about 50° C. to about 70° C. the reaction components contained in a closed pressure vessel.

5. The compounds of the general formula

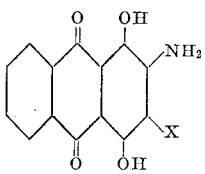

wherein X means a member of the group consisting of hydrogen and hydroxy.

6. The compound of the formula

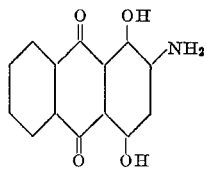

forming well-shaped black-brown crystals melting at 312° C.

7. The compound of the formula

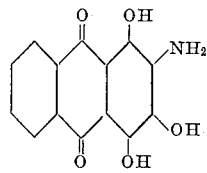

forming well-shaped brown-red needles decomposing at 335° C.

HANS SCHLICHENMAIER.
LUDWIG WILHELM BERLIN.